United States Patent
Gupta et al.

(10) Patent No.: US 10,650,325 B2
(45) Date of Patent: May 12, 2020

(54) DETERMINISTIC MESSAGE DISTRIBUTION

(71) Applicant: Microsoft Technology Licensing, LLC, Redmond, WA (US)

(72) Inventors: Rupesh Gupta, Sunnyvale, CA (US); Hsiao-Ping Tseng, Fremont, CA (US); Ravi Kiran Holur Vijay, Mountain View, CA (US); Romer E. Rosales, Burlingame, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1150 days.

(21) Appl. No.: 14/814,555

(22) Filed: Jul. 31, 2015

(65) Prior Publication Data
US 2017/0032278 A1 Feb. 2, 2017

(51) Int. Cl.
*G06N 20/00* (2019.01)
*H04L 12/58* (2006.01)
*G06N 5/04* (2006.01)
*H04L 29/08* (2006.01)

(52) U.S. Cl.
CPC ............. *G06N 20/00* (2019.01); *G06N 5/04* (2013.01); *H04L 51/24* (2013.01); *H04L 51/32* (2013.01); *H04L 51/34* (2013.01); *H04L 67/22* (2013.01); *H04L 67/2828* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 5,608,410 A | 3/1997 | Stilp et al. | |
| 8,571,930 B1 * | 10/2013 | Galperin | G06Q 30/0273 705/14.43 |
| 8,762,302 B1 * | 6/2014 | Spivack | G06N 5/046 706/12 |
| 9,760,910 B1 | 9/2017 | Tuchman et al. | |
| 9,904,916 B2 | 2/2018 | Engstrom et al. | |
| 2004/0064351 A1 * | 4/2004 | Mikurak | G06Q 10/087 705/22 |
| 2006/0059159 A1 * | 3/2006 | Truong | G06F 17/30861 |

(Continued)

OTHER PUBLICATIONS

Barreno, M. et al. (2010). "The security of machine learning". Mach Learn (2010) 81: 121-148. DOI 10.1007/s10994-010-5188-5 (Year: 2010).*

(Continued)

*Primary Examiner* — Kamran Afshar
*Assistant Examiner* — Benjamin J Buss
(74) *Attorney, Agent, or Firm* — Schwegman Lundberg & Woessner, P.A.

(57) ABSTRACT

This disclosure relates to systems and methods that include configuring a machine learning system to train on a plurality of messages, the machine learning system to output an expected number of positive responses and an expected number of negative responses based on an input message, determining a threshold differential and a weight value using responses to the plurality of messages, and sending the input message in response to a differential between the expected number of positive responses and the weight multiplied by the expected number of negative responses being above the threshold differential.

17 Claims, 11 Drawing Sheets

(56) References Cited

U.S. PATENT DOCUMENTS

| | | | |
|---|---|---|---|
| 2006/0117025 A1* | 6/2006 | Kaler | H04L 67/104 |
| 2007/0078707 A1* | 4/2007 | Axe | G06Q 30/02 |
| | | | 705/14.41 |
| 2008/0189171 A1* | 8/2008 | Wasserblat | G06Q 10/063 |
| | | | 705/7.32 |
| 2011/0173142 A1* | 7/2011 | Dasgupta | G06Q 10/107 |
| | | | 706/12 |
| 2011/0213657 A1* | 9/2011 | O'Malley | G06Q 30/0251 |
| | | | 705/14.49 |
| 2011/0238289 A1 | 9/2011 | Lehmann et al. | |
| 2011/0289106 A1* | 11/2011 | Rankin, Jr. | G06Q 10/10 |
| | | | 707/769 |
| 2011/0313842 A1* | 12/2011 | Avner | G06Q 30/0241 |
| | | | 705/14.41 |
| 2012/0192227 A1* | 7/2012 | Fleischman | H04N 21/2407 |
| | | | 725/34 |
| 2012/0272160 A1* | 10/2012 | Spivack | G06Q 10/10 |
| | | | 715/752 |
| 2013/0097019 A1* | 4/2013 | Ferber | G06Q 30/02 |
| | | | 705/14.53 |
| 2014/0006029 A1 | 1/2014 | Stanley et al. | |
| 2014/0058567 A1 | 2/2014 | Matsuoka et al. | |
| 2014/0067943 A1 | 3/2014 | Jackson et al. | |
| 2014/0122622 A1* | 5/2014 | Castera | H04L 51/32 |
| | | | 709/206 |
| 2014/0188615 A1 | 7/2014 | Badenhop | |
| 2014/0310235 A1* | 10/2014 | Chan | G06F 16/21 |
| | | | 707/603 |
| 2014/0342924 A1* | 11/2014 | Harkin | G01N 33/57407 |
| | | | 506/9 |
| 2014/0379473 A1* | 12/2014 | Zhou | G06Q 30/0256 |
| | | | 705/14.54 |
| 2015/0006286 A1 | 1/2015 | Liu et al. | |
| 2015/0006294 A1 | 1/2015 | Irmak et al. | |
| 2015/0112765 A1* | 4/2015 | Sundaresh | G06Q 10/1053 |
| | | | 705/7.31 |
| 2015/0213372 A1* | 7/2015 | Shah | H04L 51/32 |
| | | | 706/12 |
| 2015/0347924 A1* | 12/2015 | Zeng | H04L 51/30 |
| | | | 706/12 |
| 2015/0381552 A1* | 12/2015 | Vijay | H04L 51/32 |
| | | | 709/206 |
| 2016/0034973 A1 | 2/2016 | Soni et al. | |
| 2016/0048881 A1 | 2/2016 | Zhou et al. | |
| 2016/0092772 A1* | 3/2016 | Srivastava | G06F 17/30864 |
| | | | 706/12 |
| 2016/0092925 A1 | 3/2016 | Crites et al. | |
| 2016/0124925 A1* | 5/2016 | Fleischman | G06Q 10/10 |
| | | | 715/738 |
| 2016/0203509 A1 | 7/2016 | Sharp et al. | |
| 2017/0004582 A1 | 1/2017 | Engstrom et al. | |
| 2017/0073761 A1* | 3/2017 | Harkin | C12Q 1/6886 |

OTHER PUBLICATIONS

Segall, J. et al. (2012). "Predicting Reddit post popularity". 5 pages. Stanford University. (Year: 2012).*

"Non Final Office Action Issued in U.S. Appl. No. 14/839,020", dated Mar. 20, 2019, 18 Pages.

* cited by examiner

DETERMINISTIC MESSAGE DISTRIBUTION

TECHNICAL FIELD

The subject matter disclosed herein generally relates to data processing and, more particularly, to deterministic message distribution.

BACKGROUND

Providers and administrators of an online social networking service distribute messages to members for a variety of different reasons. Conventionally, members of the online social networking service desire communication regarding membership, event notification, connections, advertisements, promotions, or other aspects of a social network.

However, sending messages for every event, connection, update, advertisement, or the like, may overwhelm a messaging system and may annoy members due to messages not being sufficiently relevant to the member or the member's interests. Determining when a specific message is sufficiently relevant or interesting to a given member is challenging.

BRIEF DESCRIPTION OF THE DRAWINGS

Some embodiments are illustrated by way of example and not limitation in the figures of the accompanying drawings.

DETAILED DESCRIPTION

The description that follows includes systems, methods, techniques, instruction sequences, and computing machine program products that embody illustrative embodiments of the invention described in the present disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

BASIC DESCRIPTION

Example methods and systems are directed to deterministic message distribution. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Techniques for deterministic message distribution have been developed that provide for determining outcome probabilities for a given message and determining whether to send the message based on the outcome probabilities. Therefore, a message transmission system may restrict message transmission to those messages that will more likely elicit a response from or be more interesting to members of an online social networking service.

Figure 1:
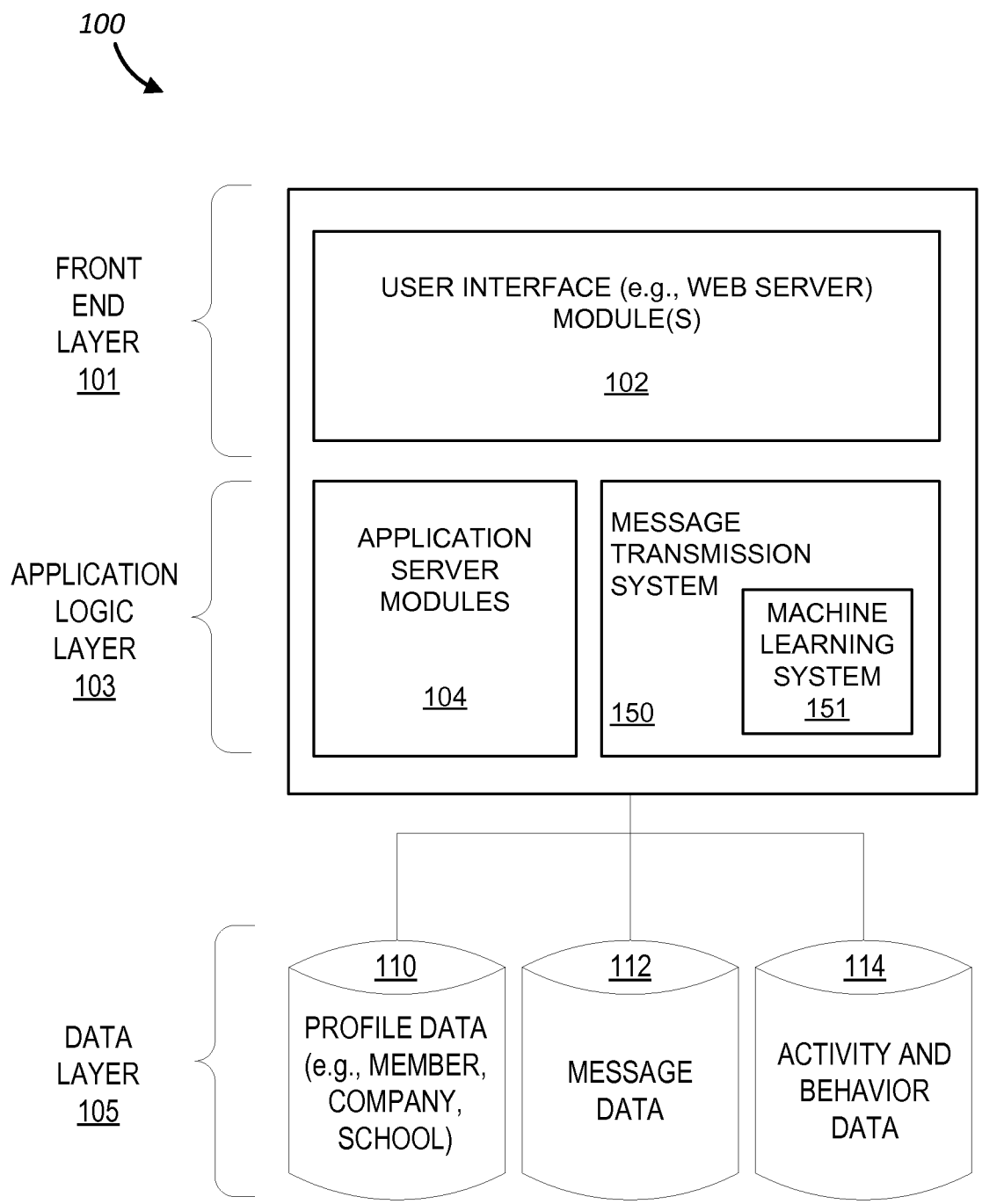
FIG. 1 is a block diagram illustrating various components or functional modules of an online social networking service, in an example embodiment.

FIG. 1 is a block diagram illustrating various components or functional modules of an online social networking service system 100, in an example embodiment. The online social networking service 100 may be utilized to manage message distribution messages. In one example, the online social networking service 100 includes the message transmission system 150 that performs the various deterministic operations described herein. In another example embodiment, the message transmission system 150 includes a machine learning system 151.

A front end layer 101 consists of a user interface module (e.g., a web server) 102, which receives requests from various client-computing devices and communicates appropriate responses to the requesting client devices. For example, the user interface module(s) 102 may receive requests in the form of Hypertext Transport Protocol (HTTP) requests, or other web-based, application programming interface (API) requests. In another example, the front end layer 101 receives requests from an application executing via a member's mobile computing device. In one example, a member submits media content for inclusion in the online social networking service 100, or requests media content from the online social networking service 100.

An application logic layer 103 includes various application server modules 104, which, in conjunction with the user interface module(s) 102, may generate various user interfaces (e.g., web pages, applications, etc.) with data retrieved from various data sources in a data layer 105.

In some examples, individual application server modules 104 may be used to implement the functionality associated with various services and features of the online social networking service. For instance, the ability of an organization to establish a presence in the social graph of the online social networking service 100, including the ability to establish a customized web page on behalf of an organization, and to publish messages or status updates on behalf of an organization, may be services implemented in independent application server modules 104. Similarly, a variety of other applications or services that are made available to members of the online social networking service 100 may be embodied in their own application server modules 104. Alternatively, various applications may be embodied in a single application server module 104.

In some examples, the online social networking service 100 includes the message transmission system 150, such as may be utilized to transmit messages, track user response to the messages, train a machine learning system 151, determine optimization variables, and determine whether to transmit a message by applying the variables and expected responses in a deterministic equation.

As illustrated, the data layer 105 includes, but is not necessarily limited to, several databases 110, 112, 114, such as a database 110 for storing profile data, including both member profile data as well as profile data for various organizations. Consistent with some examples, when a person initially registers to become a member of the online social networking service, the person may be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 110. Similarly, when a representative of an organization initially registers the organization with the online social networking service, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

Online social networking service may provide a broad range of other applications and services that allow members the opportunity to share and receive information, often customized to the interests of the member. For example, with some examples, online social networking service may include a photo sharing application that allows members to upload and share photos with other members. With some examples, members may be able to self-organize into groups, or interest groups, organized around a subject matter or topic of interest. With some examples, online social networking service may host various job listings providing details of job openings within various organizations. In one example embodiment, a member submits a message to be transmitted to other members of the online social networking service 100. The message transmission system 150 determines whether to send the message to members and/or which members to include in a distribution list for the message. In other example embodiments, the online social networking service 100 receives advertisements to be sent to members of the online social networking service 100. In another example embodiment, the online social networking service 100 is configured to notify members of upcoming events, activities, deadlines, promotions, upgrades, or to send a message to a member in any other way or for any other purpose. Therefore, this disclosure is not limited regarding the messages the online social networking service may transmit to a member.

In another example embodiment, the message transmission system 150 stores messages in the message data database 112. The message transmission system 150 may also store any and/or all message related information in the message data database 112.

As members interact with the various applications, services, and content made available via online social networking service, information concerning content items interacted with, such as by viewing, playing, and the like, may be monitored, and information concerning the interaction may be stored, for example, as indicated in FIG. 1 by the database 114. Thus, previous interactions with a content item by various members of the online social networking service 100 may be stored and utilized in determining, among other factors, how various types of content items, such as organic content items and sponsored content items, result in differences in engagement levels with the content items by members of the online social networking service 100.

In certain examples, member interactions with the online social networking service are based on a link in a message. For example, the online social networking service may include a link (e.g., a universal resource located (URL)). In response to the member clicking on the link, the member then initiates an interaction with the online social networking service. This initial interaction, as well as subsequent interactions in the user session, may also be stored in the database 114 and associated with the message sent. Therefore, message data may also include user interactions with the online social networking service 100 based on a received message.

Although not shown, with some examples, the online social networking service 100 provides an application programming interface (API) module via which third-party applications can access various services and data provided by online social networking service. For example, using an API, a third-party application may provide a user interface and logic that enables the member to submit and/or configure a set of rules used by the message transmission system 150. Such third-party applications may be browser-based applications, or may be operating system-specific. In particular, some third-party applications may reside and execute on one or more mobile devices (e.g., phone, or tablet computing devices) having a mobile operating system.

Figure 2:
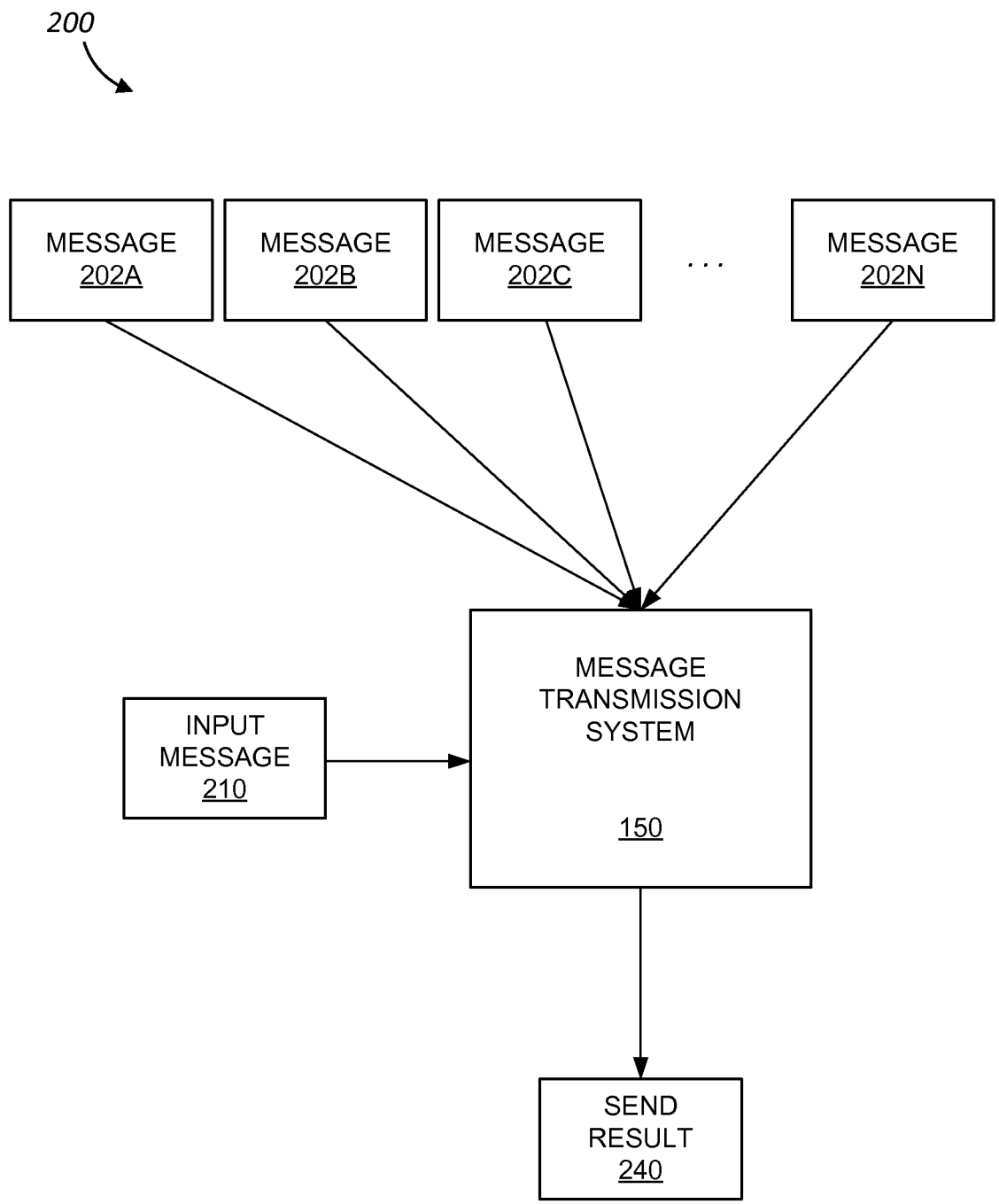
FIG. 2 is a block diagram illustrating one example scenario that includes a message transmission system according to one example embodiment.

FIG. 2 is a block diagram illustrating one example scenario 200 that includes a message transmission system 150, according to one example embodiment. According to this example, the scenario 200 includes a plurality of messages 202, the message transmission system 150, an input message 210, and a send result 240.

In one example embodiment, the online social networking service 100 transmits the messages 202 to various members of the online social networking service 100. For example, the first message 202A includes a text based link for the member to select. In response to the member selecting the link, the message transmission system 150 tracks interactions between the user and the online social networking service 100. In one example, the member selects or views an available item.

In another example, the second message 202B includes an advertisement. In response to the member selecting to view the advertisement, the message transmission system 150 stores that the member selected the advertisement. Therefore, the database 114 may include a data record that the specific advertisement resulted in a positive interaction with the user (the user selecting the advertisement).

In one example, the third message 202C includes a link; however, the member that received the third message 202C reports that the message 202C is spam. In response, the message transmission system 150 records that the message resulted in a negative response from the member. Of course, other members may not indicate that the message is spam and this disclosure is not limited this regard.

In another example embodiment, a member that receives the fourth message 202N unsubscribes from a mailing list at the online social networking service. In this example embodiment, a negative response includes the member unsubscribing from the mailing list. In response, the message transmission system 150 stores a record in the database 114 indicating that the user unsubscribed in response to the message 202N. Although the letter 'N' in the message 202N may indicate a fourth message, this disclosure is not limited in this regard as 'N' may indicate any number of messages. In one example, the $N^{th}$ message indicates the $100^{th}$ message.

In certain embodiments, as many messages are transmitted to members of the online social networking service 100, the message transmission system 150 trains a machine learning system 151 based on the messages 202 and either positive, negative, or no responses from members that received the messages 202. The message transmission system 150 further determines a threshold differential and a weight value using the responses to the previously sent messages 202 as will be further described. In one example, the system configures a multi-objective optimization problem using a message transmission objective such as minimizing the total number of sent messages; and certain constraints such as but not limited to, a maximum number of negative responses, a minimum number of positive responses. In another example embodiment, the system employs a grid search strategy to determine a best threshold value and weigh value as one skilled in the art may appreciate. Of course, one skilled in the art may recognize many other mathematical method and/or models to determine the threshold value and the weight value and this disclosure is not limited in this regard.

In one example embodiment, the message transmission system 150 receives an input message 210. An input message, as described herein, includes a message that has not yet been sent. An input message may also include a message received from a member for potential transmission to other members of the online social networking service 100. As will be further described, the message transmission system 150 applies the machine learning system 151 to generate expected numbers of either negative or positive responses, determines the threshold value and weight value, and determines whether to send the message in response to a difference between the expected number of positive responses and the weight value multiplied by the expected number of negative responses exceeding the threshold value. In another example embodiment, the message transmission system 150 transmits the message in response to the threshold value being exceeded.

In one example embodiment, the message transmission system 150 applies the machine learning system 151 to generate the expected number of positive responses and the expected number of negative responses for the input message. In this example, the system configures a multi-objective optimization problem to generate the threshold differential and a weight value. The weight value may be multiplied by the expected number of negative responses in order to weigh the expected number of negative responses against the number of positive responses. The message transmission system 150, in this embodiment, combines the response probabilities by subtracting the product of the weight value and the expected number of negative responses from the positive response probability. In response to the difference being above the threshold differential, the message transmission system 150 transmits the message. Otherwise, the message is not transmitted.

Accordingly, the message transmission system 150 significantly reduces a number of messages sent to members of the online social networking service 100 but maintains similar positive results. In certain embodiments, results include responses to the messages. The message transmission system 150 also increases the relevancy of messages to members by not sending message that will not likely result in positive responses from members.

In one specific example, the message transmission system reduces negative responses by 5%, reduces a number of messages sent by 20%, and maintains positive response results. In other embodiments, the message transmission system 150 maintains existing levels of member engagement and significantly reduces a number of sent messages. Therefore, the message transmission system 150 employs deterministic methods to more efficiently transmit messages to members of the online social networking service 100.

In other examples, as many messages that include certain terms result in more positive responses from members, the machine learning system 151 increases a number of expected positive responses for input messages that include those terms. Also, the machine learning system 151 learns times for sending messages that result in more positive responses. For example, historical messages that are transmitted at 1 AM may result in increased positive feedback versus similar messages that are transmitted at 12 PM. Therefore, the machine learning system 151 also adjusts a number of expected responses based, at least in part, on a time of day when the message is transmitted.

Therefore, in one example embodiment, the message transmission system 150 determines a best time of day when to send an input message based on the expected positive and negative responses from the machine learning system 151. For example, given time periods at hours of a day including, 10 PM, 12 AM, and 2 AM, the message transmission system 150 may determine separate and distinct expected results based on the different times. In this way, the message transmission system also determines a more efficient time of day to transmit the message. In this example, more efficient at least includes an increased probability that message being transmitted at a certain time of day results in a higher number positive responses.

In another example embodiment, the machine learning system 151 also includes a location of a recipient for a message and may statistically track various geographic locations. In this way, the machine learning system 151 adjusts expected number of responses, at least in part, on the location of the recipient. For example, messages to people in the United States may result in different responses as compared with other countries. The machine learning system 151 may track responses according to cities, counties, states, provinces, countries, continents, planets, or other spatial regions in either two or three dimensions.

Figure 3:
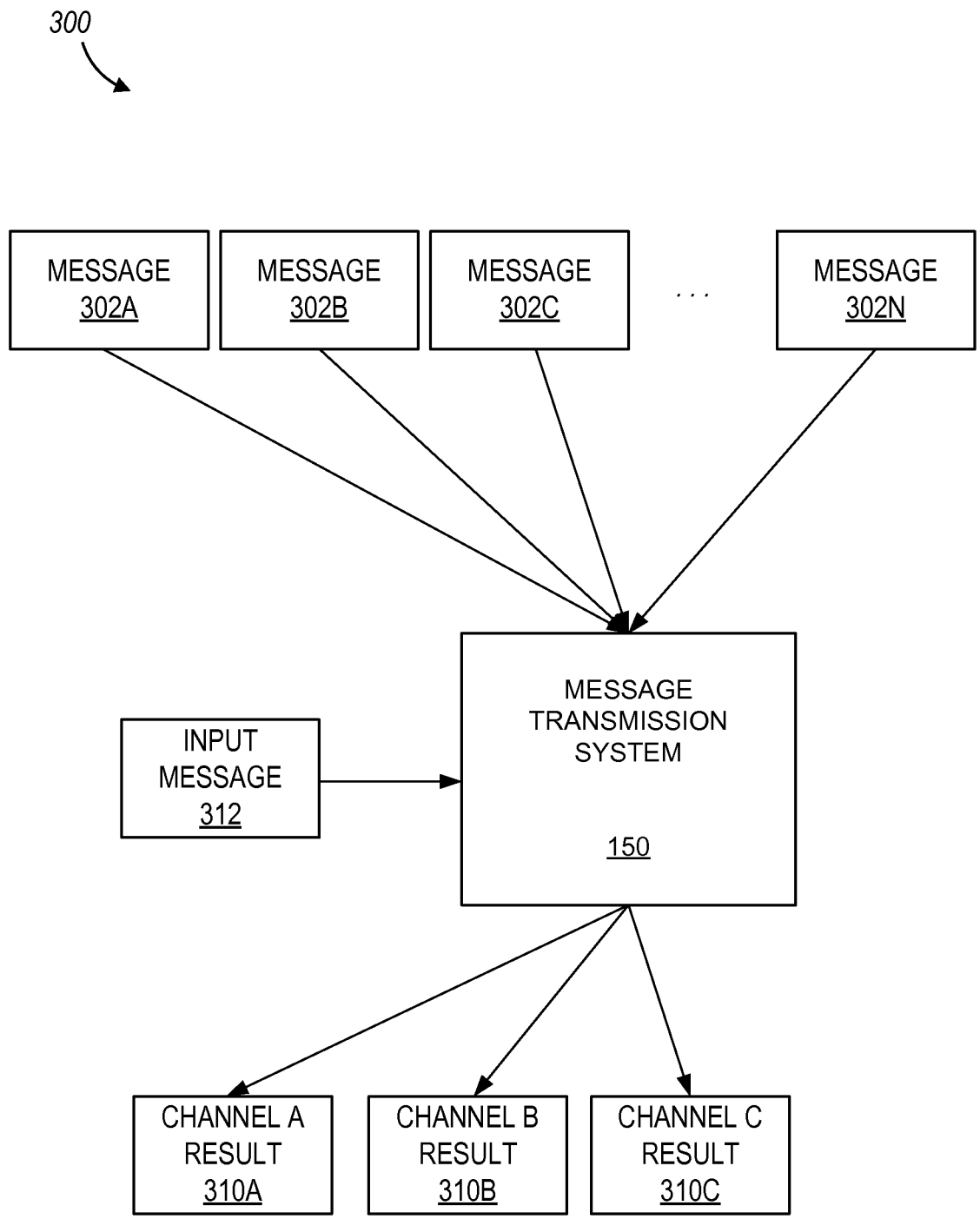
FIG. 3 is another block diagram illustrating an example scenario that includes a message transmission system according to one example embodiment.

FIG. 3 is another block diagram illustrating an example scenario that includes a message transmission system, according to one example embodiment. According to this example, the scenario 300 includes a plurality of messages 302, the message transmission system 150, an input message 312, and one or more channel results 310. The channel results 310 indicate differential between the expected number of positive response and the expected number of negative responses multiplied by the weight value. In message transmission system 150 then sends the input message via the channel that includes the highest differential in response to the highest differential exceeding the threshold differential. The message transmission system 150 further drops the message in response to the highest differential not exceeding the threshold differential.

In one example embodiment, the online social networking service 100 transmits the messages 302 to various members of the online social networking service 100 using different channels. In one example, the messages 302 are diverse in nature. Of course, they may be the same message sent to different users, but this is a non-limiting example, and the messages 302 may be any message as described herein, or other, or the like.

In one example, the first message 302A is transmitted using a mobile text message (e.g., short messaging service (SMS)) and the user responds positively. For example, the receiver of the text message clicks on an included link to visit a network resource. In this example, the second message 302B is transmitted using email and the receiver responds positively by selecting an advertisement included in the email. In this example, the third message 302C is transmitted using an application notification message and evokes a negative response from the receiver of the third message, and the fourth message 302N is transmitted using a user profile message. The message transmission system 150 trains the machine learning system 151 based on the messages 302, including their respective channels, resulting in a machine learning system 151 capable of generating statistical probabilities whether an input message will cause a negative or a positive response from the receiver of the input message based on the channel used to transmit the message.

In certain embodiments, a channel is selected from the group consisting of email, mobile text, an application notification, a profile message, and a user interface message. For example, an emailed message includes a message transmitted to an email system for a receiver. In another example, a mobile text message includes an SMS text message transmitted to a receiver's mobile device. In another example, the channel includes a notification from an application executing on a receiver's mobile computing device. For example, the channel may include a notification, an audio sound, a visual graphic, or other, or the like. In another example, the channel includes a profile message. For example, a receiver may authenticate with the online social networking service 100 and may request viewing received messages. In another example, the channel includes a user interface notification. For example, executable code may cause a graphic to be displayed in any way, as one skilled in the art may appreciate. Examples include a pop-up message, a background notification, displayed text, or other, or the like.

In one example embodiments, channel results include the differential between the expected number of positive responses and a weight value multiplied by the expected number of negative responses. In one example, the channel A result 310A is higher than results for channel B 310B and channel C 310C. In this example, and in response to the channel A result 310A exceeding the threshold differential, the message transmission system transmits the message via channel A.

Figure 4:
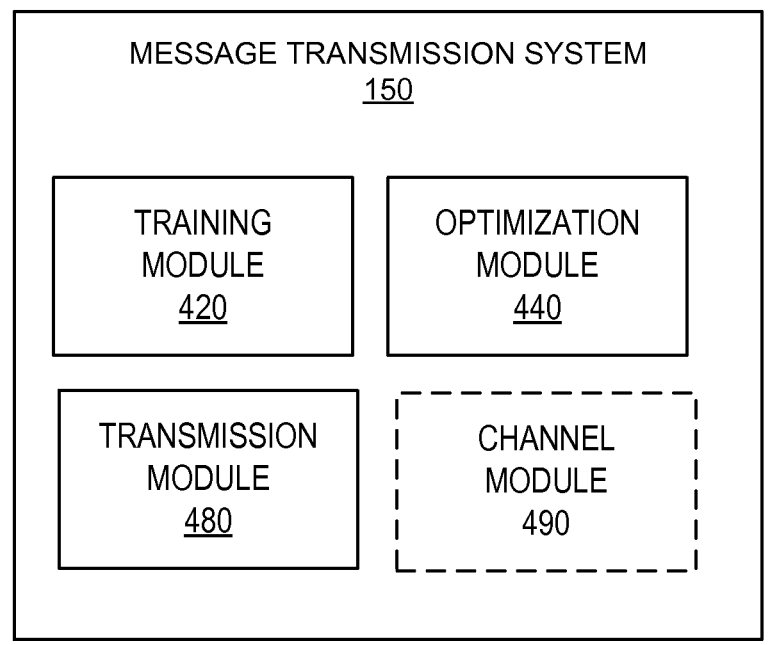
FIG. 4 is a schematic block diagram illustrating components of a message transmission system, according to one example embodiment.

FIG. 4 is a schematic block diagram 400 illustrating components of a message transmission system 150, according to one example embodiment. The message transmission system 150, in one example embodiment, includes a training module 420, an optimization module 440, a transmission module 480, and an optional channel module 490.

In one example embodiment, the training module 420 configures a machine learning system 151 to train on a plurality of messages. The training module 420 may train the machine learning system 151 on each and every property of a message. In one embodiment, a list of message properties includes, but is not limited to, a message recipient email, a carbon copy email, a blind carbon copy email, a number of recipients, a subject, a term in the subject, a term in the body of the message, a title, a header, a font size, a font color, a font property, a font type, a length of the message, an attached file, an attached file type, an attached file size, an associated item, an associated event, an included advertisement, a message size, a signature, a priority, a tag, a message type, a maximum line length, a number of terms, a longest term, a language, delayed delivery, a reply message destination, an age of a recipient, a race of a recipient, a gender of a recipient, a response from a recipient, a number of responses from a recipient, a recipient identifying the message as spam, a recipient unsubscribing from a mailing list, a recipient complaining about the message, a recipient purchasing something in response to the message, a recipient visiting a web page in response to the message, a length of a session between a recipient and a network system in response to the message, or any other property, result, or event associated with the message, or the like.

In one example embodiment, the training module 420 trains the machine learning system 151 to output an expected number of positive responses and an expected number of negative responses from recipients of the message. The machine learning system 151 may train on properties of the message, properties of a recipient, events associated with the message, or the like. The machine learning system 151 may then operate on an input message (not included in a training set of messages) to generate the expected responses described.

In another example embodiment, the training module trains the machine learning system 151 using user events occurring in response to users receiving the messages 302. In one example, a recipient clicks on a link in a message and visits a web page. The training module includes the page view. Of course, the recipient may also continue interacting with the web page and the training module 420 also trains on these subsequent events. For example, the user may continue selecting pages, entering information, or otherwise interacting with the server providing the web page. In one specific example, the training module trains on events occurring within 15 minutes of the initial page view in response to receiving the message. Of course, other time periods may be used and this disclosure is not limited in this regard. In certain embodiments, the training module 420 associates each event with the message that instigated the events.

In one embodiment, the training module 420 trains using user events based on an Internet Protocol (IP) address for the recipient. Therefore, a recipient may interact with a remote server using different web browsers or interface applications and the training module 420 still detects the user events.

In one example embodiment, the message transmission system 150 receives a set of estimate threshold differentials and weight values. In one example, the optimization module 440 receives a value of 0.5 as the weight value and a value of 1.0 as the threshold differential.

In another example embodiment, the optimization module 440 is configured to determine a threshold differential and a weight value.

For example, where previously a million messages were sent resulting in 50,000 page views, the optimization module 440 is configured to minimize a number of sent messages but to also maintain a number of page views above 40,000, or 80% of the original number of page views. Of course, other values may be used and this disclosure is not limited in this regard. In another example embodiment, the optimization module 440 receives a percentage of positive responses as a threshold percentage, and the multi-objective module 440 is configured to minimize a number of messages to send while maintaining at least the threshold percentage of positive responses.

In another example, the multi-objective module 440 receives threshold percentages from a user of the message transmission system 150. For example, the multi-objective module 440 may receive threshold percentages that indicate a minimum number of messages such that the number of page views remains above 85% of the page views for a previous set of messages and a threshold number of negative responses is 50% of previous negative responses. In this example, the message transmission system 150 is configured to minimize the number of messages to send such that the number of page views remains above 85% of the page views for a previous set of messages and a threshold number of negative responses is 50% of the previous negative responses.

In another example embodiment, the optimization module 440 receives threshold values and weight values from a user. For example, the optimization module 440 minimizes a number of messages to send while maintaining a number of positive responses above a threshold number and a number of complaints below a threshold number. In one example, the multi-object module 440 minimizes a number of messages to send while keeping a number of page views above 10,000 and a number of complaints below 1,000. Of course, other values may be used and this disclosure is not limited in this regard.

In certain embodiments, a positive response includes at least one of a page view, a clicked link, a purchase, a like, a comment, a click, a reference, a referral, a vote, or other response that is consistent with a request included in the message, or other response that one skilled in the art recognizes as positive. In other embodiments, a negative response includes at least one of an unsubscribe, a complaint, identifying the message as spam, a dislike, or other response that one skilled in the art would recognize as negative.

In another example embodiment, the optimization module 440 applies a grid search method as one skilled in the art may appreciate. For example, the optimization module 440 may apply a set of data points that include a weight value and a threshold differential resulting in a table of records (one record for each application of a data point). In this example, each data point is applied to the results of sending the plurality of messages resulting in a data record for each data point. The data record includes the threshold differential, the weight value, the expected number of positive responses, the expected number of negative responses, and the number of messages that would have been sent based on the weight value and the threshold differential. In this example embodiment, the optimization module 460 then determines the record in the table having less than a threshold number of negative responses, more than a threshold number of positive responses, and a least number of messages being sent from the set of messages. In this way, the optimization module 460 selects the threshold differential and the weight value from the selected record as the threshold differential and the weight value to be used by the transmission module 480 to determine whether to transmit an input message as described herein.

In another example embodiment, the data records further include a channel. In this way, the optimization module 440 further determines a best threshold differential, and best weight, and a best channel to use for determining whether to send an input message via the channel.

In one example embodiment, the training module 420 trains on messages transmitted on a daily basis. In one example, the training module 420 trains on the messages transmitted each day over the past week. In another example, the training module 420 trains on the most recent 100,000 messages. Of course, these values are non-limiting as any number of recent messages may be used to train the machine learning system 151.

In one example embodiment, the transmission module 480 is configured to determine whether a difference between the expected number of positive responses of a message and the expected number of negative responses of the message exceeds the threshold differential generated by the optimization module 440. In another example embodiment, the optimization module 440 multiplies the expected number of negative responses by a weight value as described herein.

In certain embodiments, the optimization module 440 applies the expected number of positive responses and the expected number of negative responses in an equation that includes one or more scalars and one or more terms. Of course, other equations may be used and this disclosure is not limited in this regard.

In one specific non-limiting example, an expected number of positive responses is represented using $R_P$, the expected number of negative responses is represented using $R_N$, S is a scalar representing a weight value, T represents the threshold probability differential, and the equation is consistent with Equation 1.

$$R_P - S*R_N > T \qquad \text{Equation 1}$$

In this example, the optimization module 440 optimizes the weight value 'S' and the threshold value 'T' to minimize a number of message to send while maintaining a number of positive responses above a threshold number and reducing a number of negative responses below a threshold number, as previously described. In this example, the optimization module 440 determines whether Equation 1 holds true for a given input message. For example, the expected number of positive responses $R_P$ and the expected number of negative responses $R_N$ are outputs of the machine learning system 151 trained by the training module 420.

In another example embodiment, the optimization module 440 then applies a set of data points that include the weight value and the threshold differential resulting in a table of records. In this example, each record in the table includes the weight value, the threshold differential, the expected number of negative responses, the expected number of positive responses, and the number of messages sent from the set. The optimization module 440 further stores the messages to be sent as part of the record. In this example embodiment, the transmission module 480 then determines the record in the table that includes the least number of messages to send while meeting the constraints. In this example embodiment, the constraints include a minimum number of positive responses, and a maximum number of negative responses. The optimization module 440 therefore, determines the threshold value and weight value by indicating the values in the selected record.

In other example embodiment, the transmission module 480 also determines a time of day to transmit the message. As one skilled in the art may appreciate, transmitting messages at different times affects the receiver's response to the message. Therefore, the training module 420 may train on a time of day when the message is transmitted and the optimization module 440 may include a time of day for the multi-objective optimization problem. In this way, and as described herein, the message transmission system 150 determines a best time of day to transmit the input message based on the best time of day resulting in the highest differential between the expected number of positive responses and the weight value multiplied by the expected number of negative responses.

In one example embodiment, the message transmission system also includes the channel module 490. In one embodiment, the channel module 490 is configured to determine a channel for the message that results in a highest difference between the expected number of positive responses and the weight value multiplied by the expected number of negative responses. In one example embodiment, the transmission module 480 transmits a message using the selected channel based on the probability differential for the channel between the expected number of positive responses for the channel and the expected number of negative responses for the channel exceeding a threshold probability differential.

Figure 5:
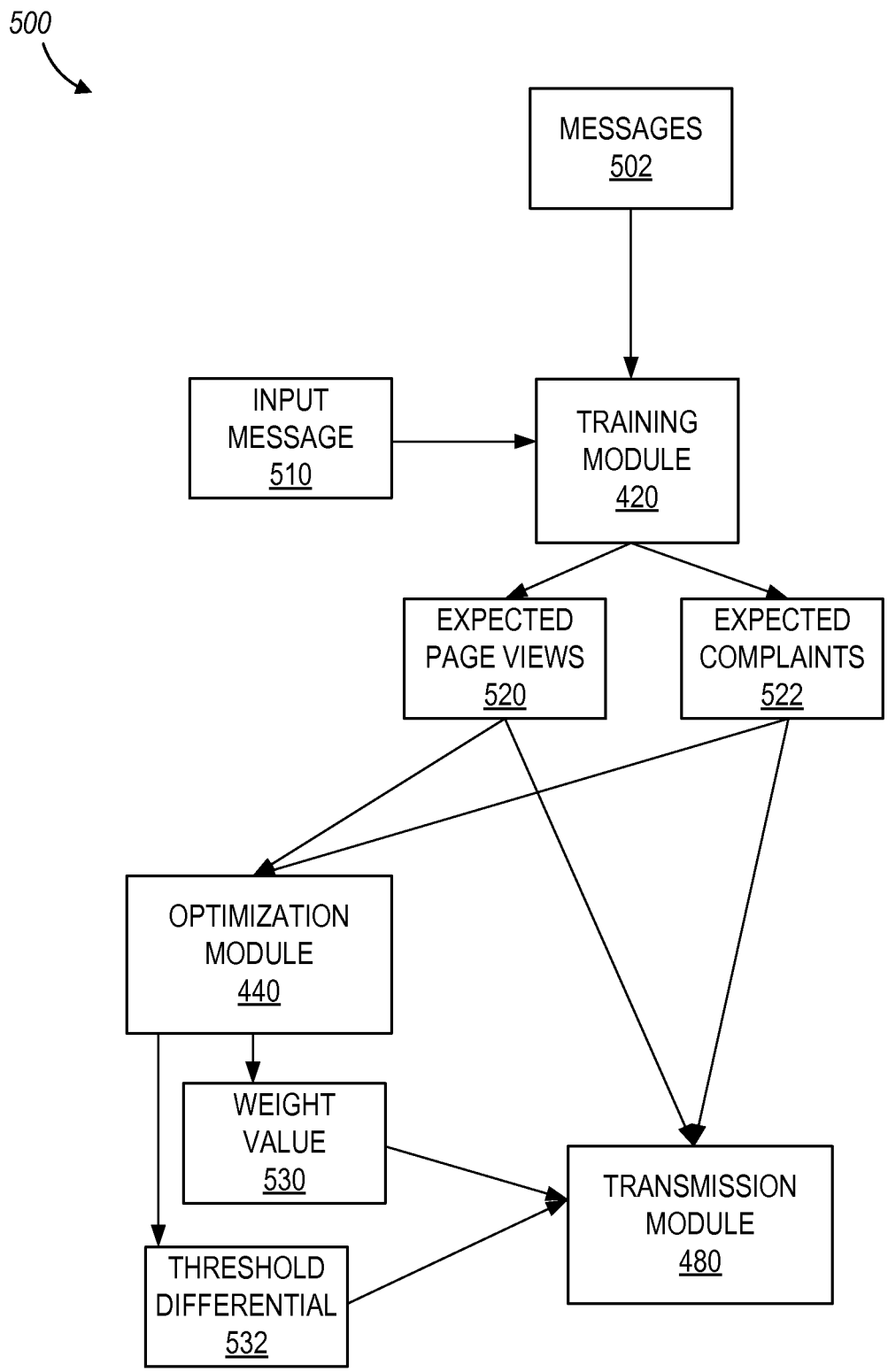
FIG. 5 is a schematic block diagram illustrating another example scenario for a message transmission system, according to an example embodiment.

FIG. 5 is a schematic block diagram illustrating another example scenario 500 for a message transmission system, according to an example embodiment. In this example embodiment, the training module 420 trains on a set of messages 502 and is configured to generate an expected number of page views (one example of a positive response) 520 for an input message 510 and an expected number of complaints (one example of a negative response) 522 for the input message 510.

In this example embodiment 500, the optimization module 440 receives the expected number of page views 520 and the expected number of complaints 522 from the training module 420 and applies the solution to the multi-objective optimization problem to generate a weight value 530 and a threshold probability differential value 532 according to an equation used to optimize the multi-objective optimization problem, as one skilled in the art may appreciate.

The optimization module 440, in this example embodiment, subtracts the product of the weight value and the expected number of complaints 522 from the expected number of page views 520, thereby resulting in a probability differential. The transmission module 480 transmits the message in response to the probability differential exceeding the threshold probability differential value 532.

In certain embodiments, although a multi-objective optimization problem includes the term "optimize," it is not necessary that the solution be the most optimal solution. In some embodiments, an optimized solution to the multi-objective optimization problem is merely a best solution discovered by the optimization module 440. Therefore, the solution may not be "optimal" but may simply be the best so far. The solution may further be dependent on an amount of computing resources applied to the solution. In some examples, the "optimal" solution is a local minimum or maximum. In other examples, the "optimal" solution is without a threshold error from a theoretical optimal solution. In one example, the "optimal" solution is an optimal practical solution which may be less optimal than the optimal theoretical solution. In another example, the "optimal" solution is a point closest to a solution point on a Pareto-optimal front, as one skilled in the art may appreciate. Similarly, use of a "best" value indicates a best value discovered and not necessarily a theoretical or practical best.

Figure 6:
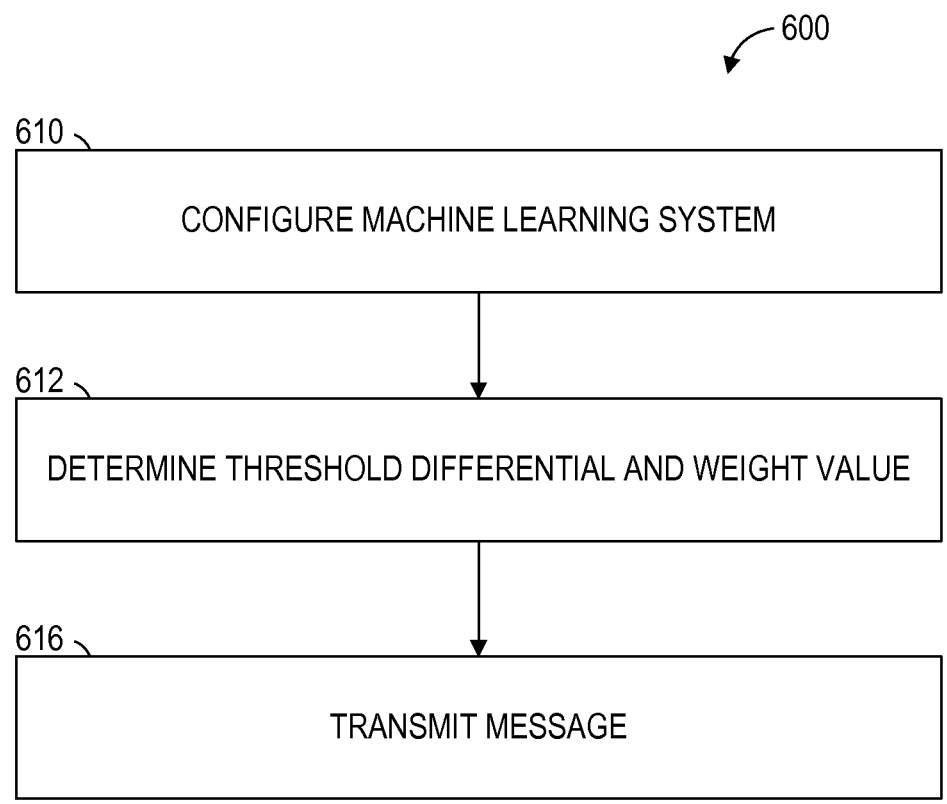
FIG. 6 is a flow chart diagram illustrating a method of deterministic message distribution, according to an example embodiment.

FIG. 6 is a flow chart diagram illustrating a method 600 of deterministic message distribution, according to an example embodiment. According to one example embodiment, operations in the method 600 may be performed by the message transmission system 150, using modules described above with respect to FIG. 4. As shown in FIG. 6, the method 600 includes operations 610, 612, and 616.

In one embodiment, the method 600 begins at operation 610 and the training module configures a machine learning system 151 to train on a plurality of messages. In another embodiment, the machine learning system 151 outputs an expected number of positive responses based on an input message and an expected number of negative responses based on the input message. For example, thousands or millions of messages are transmitted to members of an online social networking service, and the training module trains the machine learning system 151 on the transmitted messages and responses from the members based on the messages.

The method 600 continues at operation 612 and the optimization module 440 determines a threshold differential and a weight value. In one example, the optimization module 440 solves a multi-objective optimization problem to optimize a number of messages to send based on responses to the messages and according to a set of constraints as described herein. In another example, the optimization module 440 applies a grid search technique as one skilled in the art may appreciate. A grid search technique may be used to discover a best threshold differential and a best weight value as previously described. The method 600 continues at operation 616 and the transmission module 480 sends the input message in response to input message satisfying Equation 1.

Figure 7:
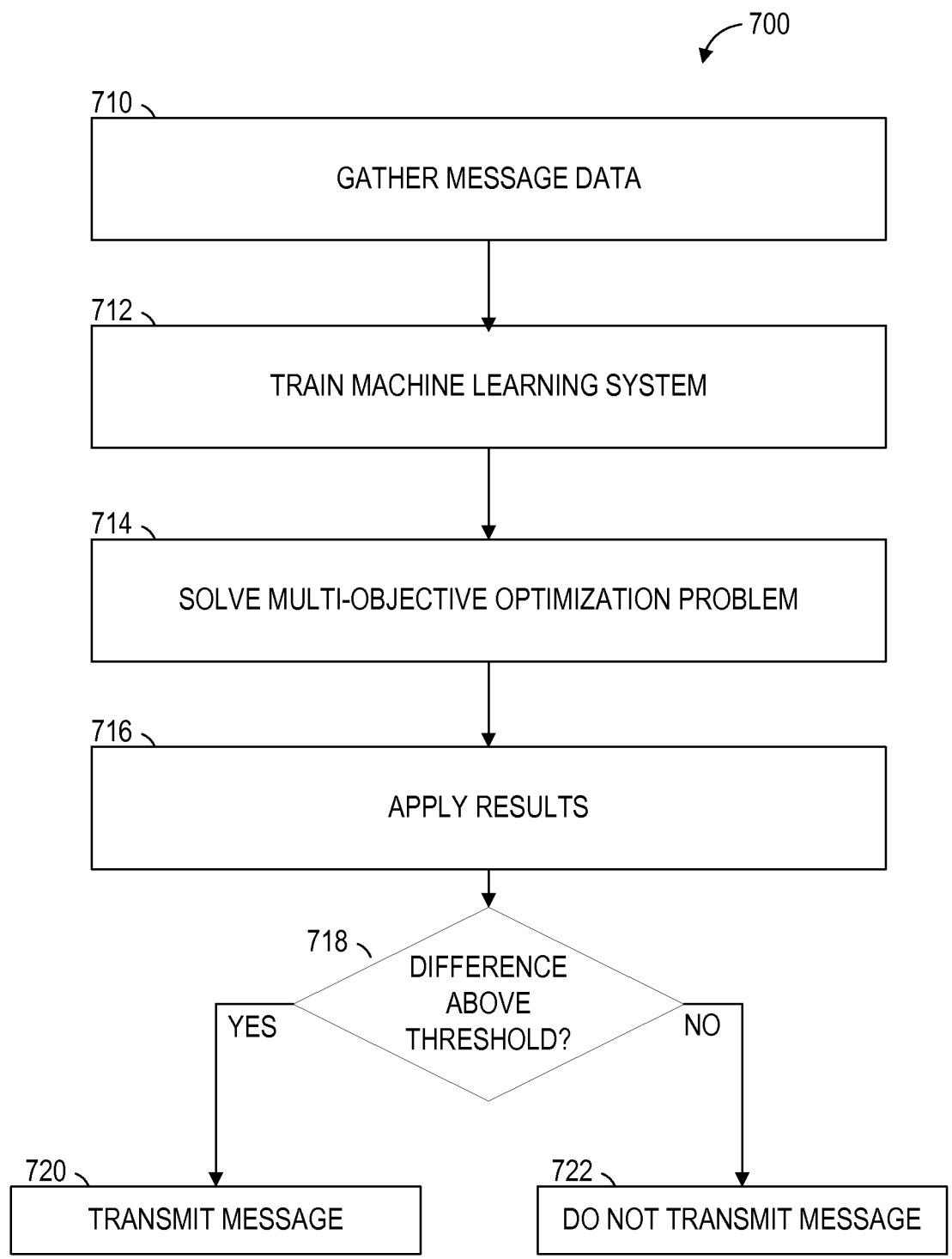
FIG. 7 is a flow chart diagram illustrating a method of deterministic message distribution, according to an example embodiment.

FIG. 7 is a flow chart diagram illustrating a method 700 of deterministic message distribution, according to an example embodiment. According to one example embodiment, operations in the method 700 may be performed by the message transmission system 150, using modules described above with respect to FIG. 4. As shown in FIG. 7, the method 700 includes operations 710, 712, 714, 716, 718, 720 and 722.

In one embodiment, the method 700 begins at operation 710 and the training module 420 gathers message data based on a set of messages transmitted to members of an online social networking service. The training module 420, in one example, also gathers responses from the members based on the messages. In one example, a link included in the message also causes a system to notify the training module 420 when the link is clicked, thus notifying the training module 420 when a positive response is received.

The method 700 continues at operation 712 and the training module 420 configures a machine learning system 151 to train on the gathered message data. In another embodiment, the machine learning system 151 outputs an expected number of positive responses based on an input message and an expected number of negative responses based on the input message. For example, in response to messages being transmitted to members of an online social networking service, the training module trains the machine learning system 151 on the transmitted messages and responses from the members based on the messages.

The method 700 continues at operation 714 and the optimization module 440 solves a multi-objective optimization problem to determine the threshold differential and the weight value. The method 700 continues at operation 716 and the optimization module 440 applies the threshold differential, the weight value, the expected number of positive responses and the expected number of negative responses as described in Equation 1.

The method 700 continues at operation 718 and in response to the difference between the expected number of positive responses and the weight value multiplied by the expected number of negative responses, the transmission module 480, at operation 720, transmits the message. In response to the difference not exceeding the threshold differential, the transmission module 480, at operation 722, does not transmit the message.

Figure 8:
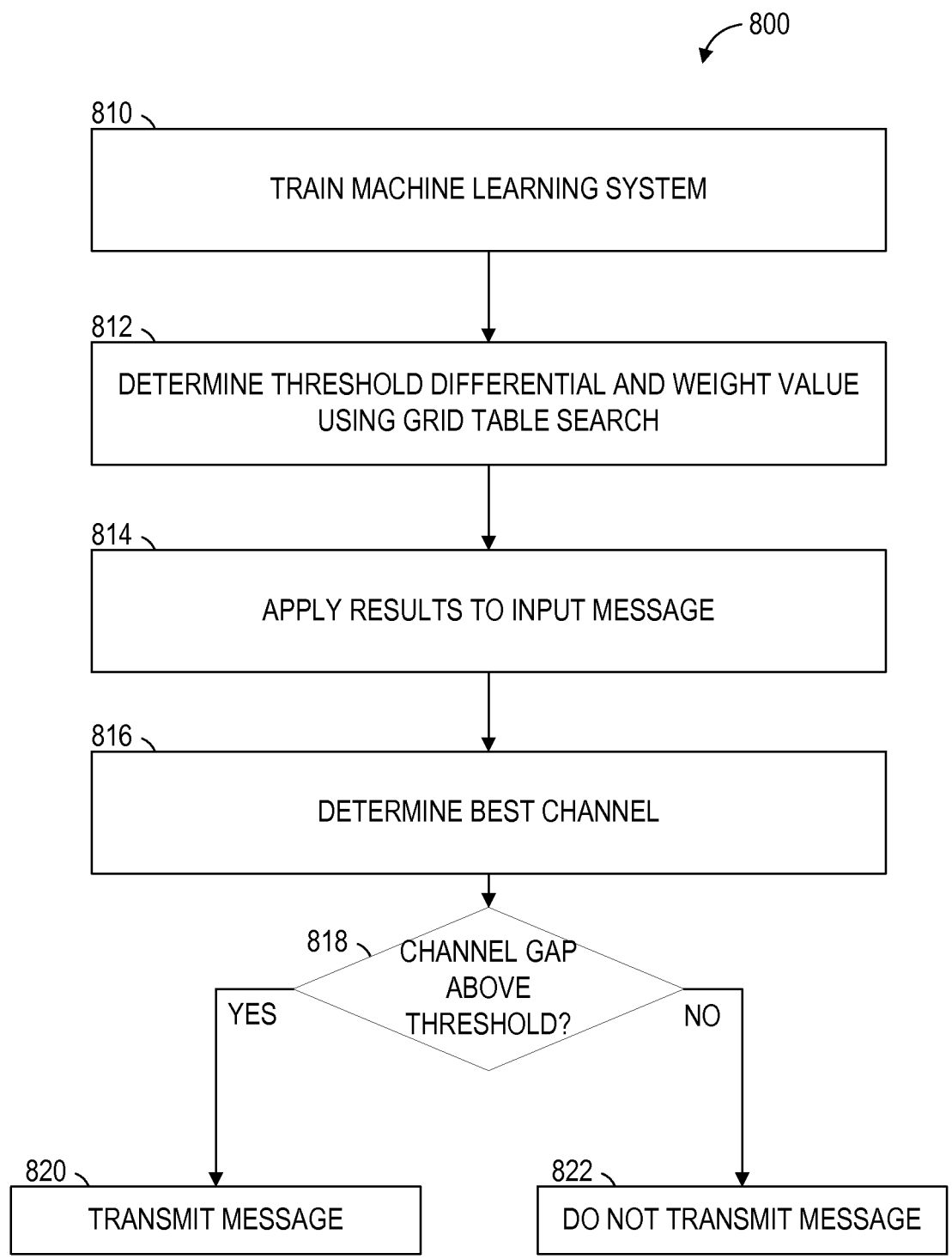
FIG. 8 is a flow chart diagram illustrating a method of deterministic message distribution, according to an example embodiment.

FIG. 8 is a flow chart diagram illustrating a method 800 of deterministic message distribution, according to an example embodiment. According to one example embodiment, operations in the method 800 are performed by the message transmission system 150, using modules described above with respect to FIG. 4. As shown in FIG. 8, the method 800 includes operations 810, 812, 814, 816, 818, 820 and 822.

In one embodiment, the method 800 begins at operation 810 and the training module configures a machine learning system 151 to train on a plurality of messages. In another embodiment, the machine learning system 151 outputs an expected number of positive responses based on an input message and an expected number of negative responses based on the input message. For example, thousands or millions of messages are transmitted to members of an online social networking service and the training module trains the machine learning system 151 on the transmitted messages and responses from the members based on the messages.

The method 800 continues at operation 812 and the optimization module 440 determines a threshold differential and a weight value using a grid table search. The method 800 continues at operation 814 and the optimization module 440 applies results of the machine learning system 151 and the determined values for each channel that could transmit the message.

The method 800 continues at operation 816 and the channel module 490 determines which channel has the highest differential. In one example, a first channel has a probability differential between the expected number of negative responses multiplied by the weight value and the expected number of positive responses of 0.4 and a second channel has a response probability differential of 0.45. In this example, the channel module 490 selects the second channel because it has a higher differential.

The method 800 continues at operation 818 and the transmission module 480 determines whether the probability differential for the message via the determined channel exceeds the threshold probability differential. In response to the probability differential for the message via the selected channel exceeding the threshold probability differential, the method 800 continues at operation 820 and the transmission module 480 transmits the message via the selected channel. In response to the probability differential for the message via the selected channel not exceeding the threshold probability differential, the method 800 continues at operation 824 and the transmission module 480 prevents transmission of the message via the selected channel.

Figure 9:
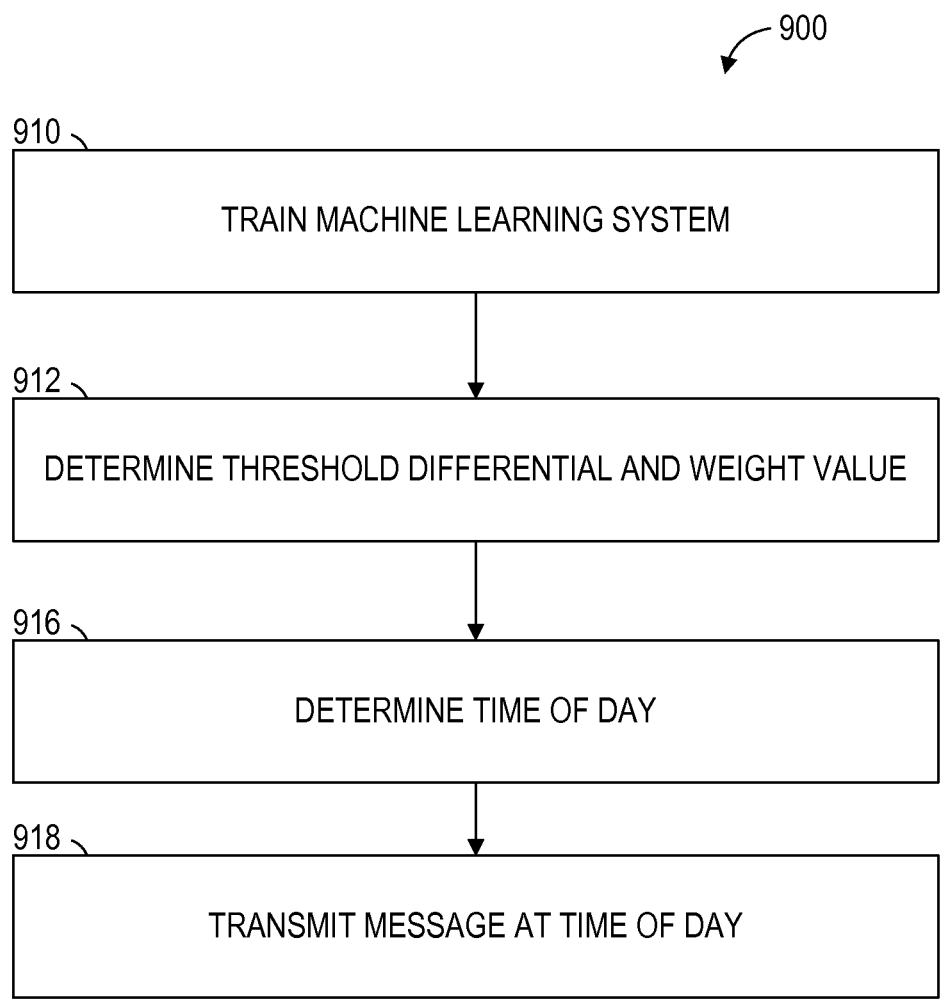
FIG. 9 is a flow chart diagram illustrating a method of deterministic message distribution, according to an example embodiment.

FIG. 9 is a flow chart diagram illustrating a method 900 of deterministic message distribution, according to an example embodiment. According to one example embodiment, operations in the method 900 are performed by the message transmission system 150, using modules described above with respect to FIG. 4. As shown in FIG. 9, the method 900 includes operations 910, 912, 916, and 918.

In one embodiment, the method 900 begins at operation 910 and the training module configures a machine learning system 151 to train on a plurality of messages. In another embodiment, the machine learning system 151 outputs an expected number of positive responses based on an input message and an expected number of negative responses based on the input message. For example, thousands or millions of messages are transmitted to members of an online social networking service and the training module trains the machine learning system 151 on the transmitted messages and responses from the members based on the messages.

The method 900 continues at operation 912 and the optimization module 440 determines a threshold differential and weight value. The method 900 continues at operation 916 and the transmission module 480 determines a time of day for transmitting the message. In one example embodiment, the times of day include 4 AM, 6 AM, 8 AM, 10 AM, and 12 PM and the transmission module 480 determines the available time of day that has the greatest differential. Of course, other times of day may be included and this disclosure is not limited in this regard. In response to the differential for the best time of day exceeding the threshold differential, the method continues at operation 918 and the transmission module sends the message at the time of day determined at operation 916.

Figure 10:
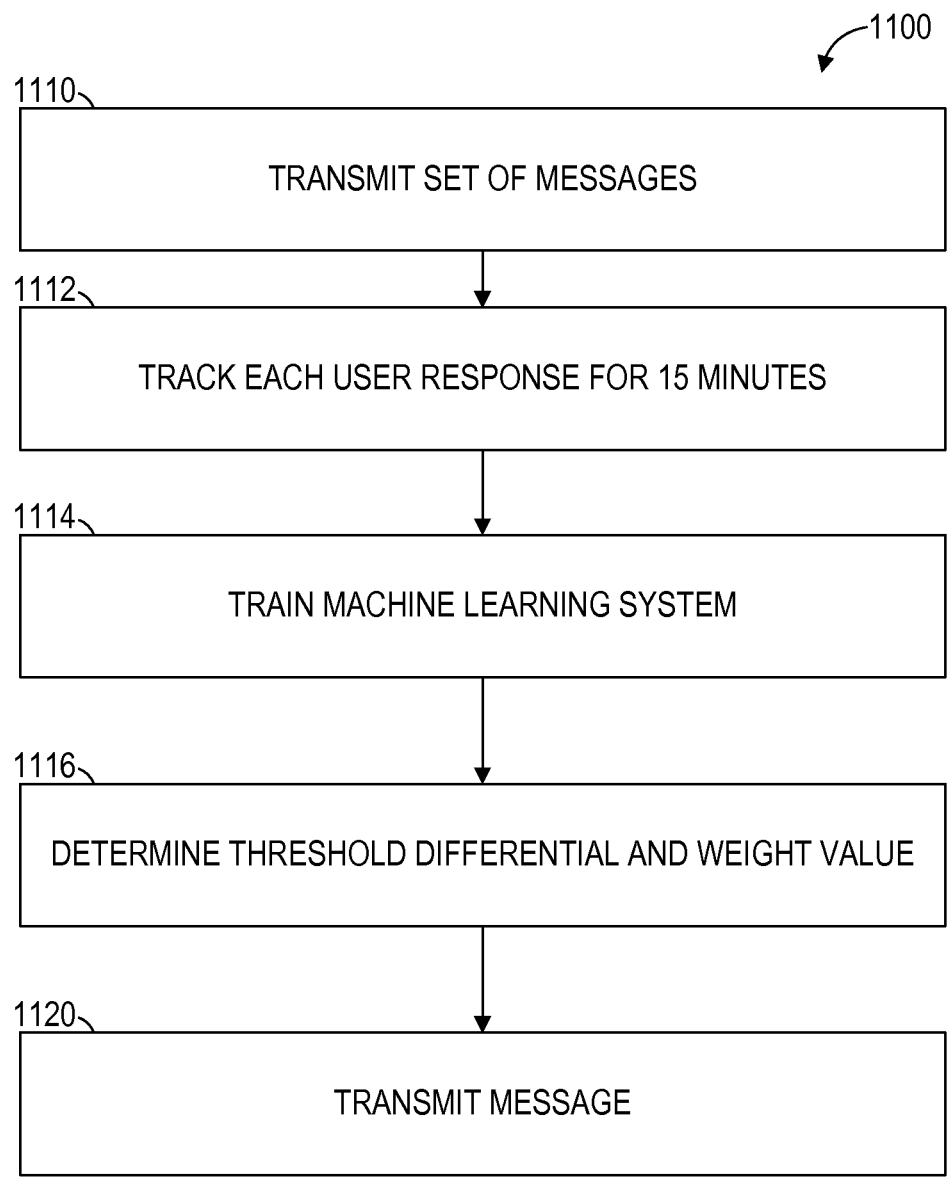
FIG. 10 is a flow chart diagram illustrating a method of deterministic message distribution, according to an example embodiment.

FIG. 10 is a flow chart diagram illustrating a method 1100 of deterministic message distribution, according to an example embodiment. According to one example embodiment, operations in the method 1100 may be performed by the message transmission system 150, using modules described above with respect to FIG. 4. As shown in FIG. 10, the method 1100 includes operations 1110, 1112, 1114, 1116, and 1120.

In one embodiment, the method begins at operation 1110 and the transmission module 480 transmits a set of messages to members of the online social networking service 100. In certain embodiments, the messages are transmitted via at least one of email, mobile text messages, a profile message, an application notification, or the like.

The method 1100 continues at operation 1112 and the training module 420 tracks responses from receivers of the messages transmitted in operation 1110. In certain examples, the responses include at least one of positive responses such as, but not limited to, a page view, a purchase, a like, selecting a link, or the like. In other examples, the responses include at least one of a complaint, a dislike, an unsubscribe, a poor rating, or the like.

In one embodiment, the method 1100 continues at operation 1114 and the training module 420 configures a machine learning system 151 to train on a plurality of messages. In another embodiment, the machine learning system 151 outputs an expected number of positive responses based on an input message and an expected number of negative responses based on the input message. For example, thousands or millions of messages are transmitted to members of an online social networking service and the training module trains the machine learning system 151 on the transmitted messages and responses from the members based on the messages.

The method 1100 continues at operation 1116 and the multi-objective optimization module 440 determines a threshold value and a weight value. The method 1100 continues at operation 1120 and the transmission module 480 sends the input message in response to the difference exceeding the threshold probability differential. For example, where the difference between the expected number of positive responses for the input message and the expected number of negative responses multiplied by the weight value for the input message is 0.46 and the threshold probability differential is 0.41, the transmission module 480 transmits the message. In another example, where the difference is 0.42 and the threshold differential is 0.49, the transmission module 480 denies sending the message, deletes the message, or performs another action such that the message is not transmitted to the intended recipient.

Figure 11:
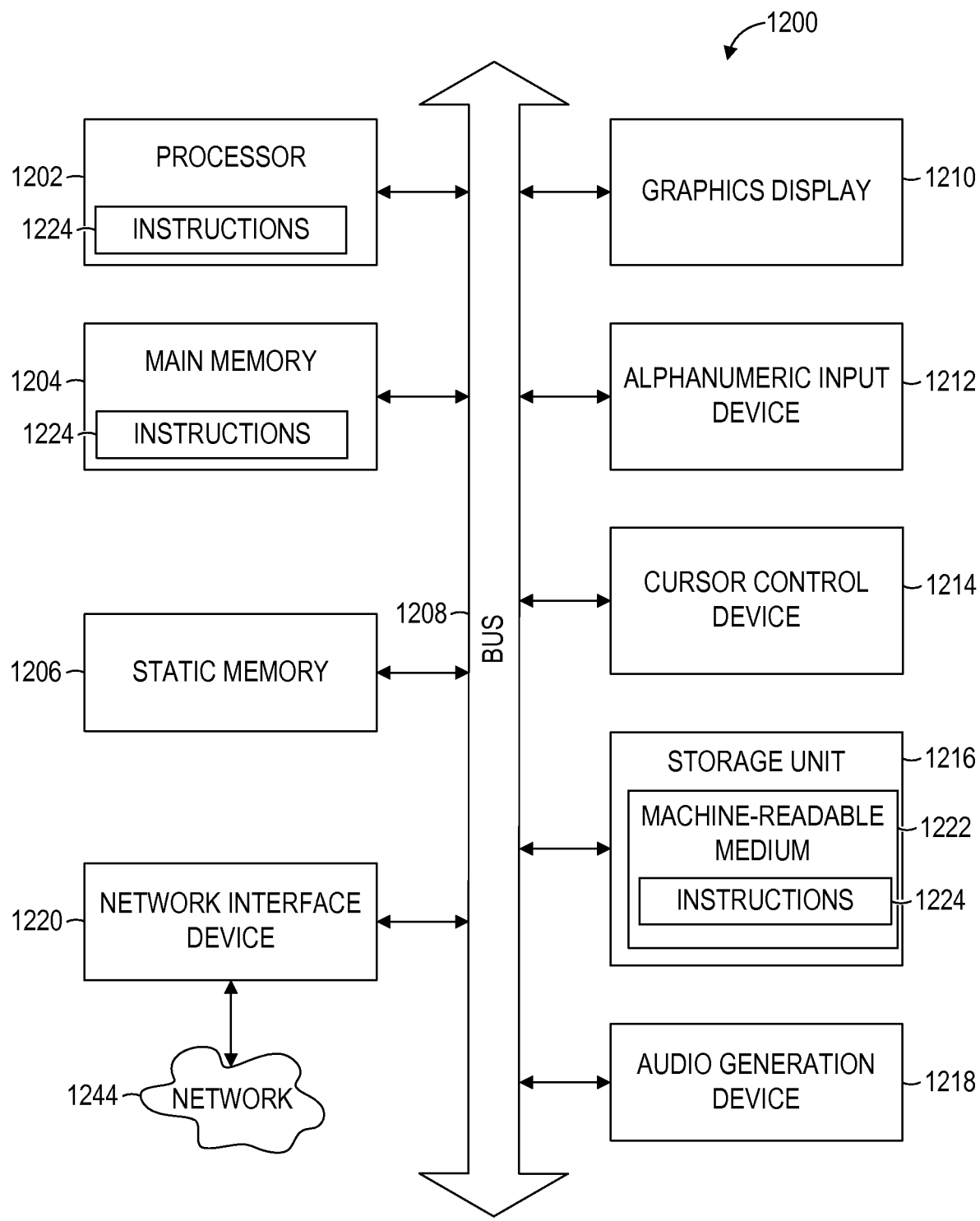
FIG. 11 is a block diagram illustrating components of a machine able to read instructions from a machine-readable medium.

FIG. 11 is a block diagram illustrating components of a machine able to read instructions from a machine-readable medium. Specifically, FIG. 12 shows a diagrammatic representation of the machine 1200 in the example form of a computer system and within which instructions 1224 (e.g., software) for causing the machine 1200 to perform any one or more of the methodologies discussed herein may be executed. In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a peer-to-peer (or distributed) network environment. The machine 1200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include a collection of machines that individually or jointly execute the instructions 1224 to perform any one or more of the methodologies discussed herein. In certain embodiments, the various modules described in FIG. 4 are implemented as part of the instructions 1224.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a light emitting diode (LED) display, a liquid crystal display (LCD), a projector, or a cathode ray tube (CRT)). The machine 1200 may also include an alphanumeric input device 1212 (e.g., a keyboard), a cursor control device 1214 (e.g., a mouse, a touchpad, a trackball, a joystick, a motion sensor, or other pointing instrument), a storage unit 1216, a signal generation device 1218 (e.g., a speaker), and a network interface device 1220.

The storage unit 1216 includes a machine-readable medium 1222 on which is stored the instructions 1224 (e.g., software) embodying any one or more of the methodologies, modules, or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media. The instructions 1224 may be transmitted or received over a network 1244 via the network interface device 1220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 1200), such that the instructions, when executed by one or more processors of the machine (e.g., processor 1202), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
 a non-transitory machine-readable medium having instructions stored thereon, which, when executed by a processor, cause the system to:
 configure a machine learning system to train on a plurality of training messages, wherein each individual instance of each training message has previously been sent to a first plurality of members of the online system, and each individual instance of each training message indicates one of a plurality of channels by which the individual instance of the training message was sent, and each individual instance of each training message is associated with one of either a positive response, negative response, or no response, from each member to whom the individual instance of the training message was sent, the machine learning system, subsequent to being trained and upon receiving an input message, to output an expected number of positive responses and an expected number of negative responses to be received from a second plurality of members, for each channel of the plurality of channels, based on the input message;

for the input message targeted for distribution to the second plurality of members of the online system, using the trained machine learning system to generate output indicating a number of positive responses expected from the second plurality of members and a number of negative responses expected from the second plurality of members, for each channel of the plurality of channels;

calculate, for each channel of the plurality of channels for the input message, a differential value by subtracting from the number of positive responses expected from the second plurality of members, the number of negative responses expected from the second plurality of members, the number of negative responses multiplied by a weighting factor prior to said subtracting;

select a channel for the input message that results in a highest differential value of the differential values calculated for the input message; and send the input message to the second plurality of members via the selected channel in response to the highest differential value exceeding a threshold differential value.

2. The system of claim 1, wherein the channel is selected from the group consisting of email, mobile text messaging, an application notification, and a profile message.

3. The system of claim 1, wherein the training messages previously sent to the first plurality of members of the online system indicate a particular time of day at which they were received, and the machine learning system is to output an expected number of positive responses and an expected number of negative responses from the second plurality of members, for each of several different times of day, the instructions further cause the system to select a time of day to send the input message that results in a highest differential value between the expected number of positive responses and the expected number of negative responses multiplied by the weighting factor, the system sending the input message at the time of day in response to the highest differential value exceeding the threshold differential value.

4. The system of claim 1, wherein the expected number of positive responses is based on at least one of page views, clicked links, purchases, likes, and comments, and the expected number of negative responses are based on at least one of unsubscribes, complaints, dislikes, and spam reports.

5. The system of claim 1, wherein the machine learning system is configured to train on a user's activity for a threshold period of time based on a response to one of a plurality of messages.

6. The system of claim 5, wherein the user's activity is tracked using the user's network address.

7. The system of claim 1, wherein determining the threshold differential value and the weighting factor is based on a multi-objective optimization problem using constraints comprising a maximum number of negative responses and a minimum number of positive responses.

8. The system of claim 7, wherein determining the threshold differential value and the weighting factor is accomplished by applying a set of estimated threshold differential values and estimated weighting factors and selecting the threshold differential value and the weighting factor from the set that minimizes the number of messages to send while satisfying the constraints.

9. A method comprising:

configuring a machine learning system to train on a plurality of training messages, wherein each individual instance of each training message has previously been sent to a first plurality of members of the online system, each individual instance of each training message indicates one of a plurality of channels by which the instance of the training message was sent, and each individual instance of each training message is associated with one of either a positive response, negative response, or no response, from the member to whom the individual instance of the training message was sent, the machine learning system, subsequent to being trained and upon receiving an input message, to output an expected number of positive responses and an expected number of negative responses to be received from a second plurality of members, for each channel of the plurality of channels, based on the input message;

for the input message targeted for distribution to the second plurality of members of the online system, using the trained machine learning system, generating output indicating a number of positive responses expected from the second plurality of members and a number of negative responses expected from the second plurality of members, if the input message is sent to the second plurality of members, for each channel of the plurality of channels;

calculating, for each channel of the plurality of channels for the input message, a differential value by subtracting from the number of positive responses expected from the second plurality of members, the number of negative responses expected from the second plurality of members, the number of negative responses multiplied by a weighting factor prior to said subtracting;

selecting a channel for the input message that results in a highest differential value of the differential values calculated for the input message; and sending the input message to the second plurality of members via the selected channel in response to the highest differential value exceeding a threshold differential value.

10. The method of claim 9, wherein the channel is selected from the group consisting of email, mobile text messaging, an application notification, and a profile message.

11. The method of claim 9, wherein the training messages previously sent to the first plurality of members of the online system indicate a particular time of day at which they were received, and the machine learning system is to output an expected number of positive responses and an expected number of negative responses, for each of several different times of day, the method further comprising selecting a time of day to send the input message that results in a highest differential value between the expected number of positive responses and the expected number of negative responses multiplied by the weighting factor, the system sending the input message at the selected time of day in response to the highest differential value exceeding threshold differential value.

12. The method of claim 9, wherein the expected number of positive responses is based on at least one of page views, clicked links, purchases, likes, and comments, and the expected number of negative responses are based on at least one of unsubscribes, complaints, dislikes, and spam reports.

13. The method of claim 9, wherein the machine learning system is configured to train on a user's activity for a threshold period of time based on a response to one of a plurality of messages.

14. The method of claim 13, wherein the user's activity is tracked using the user's network address.

15. The method of claim 9, wherein determining the threshold differential value and the weighting factor is based on a multi-objective optimization problem using the constraints comprising a maximum number of negative responses and a minimum number of positive responses.

16. The method of claim 15, wherein determining the threshold differential value and the weighting factor is accomplished by applying a set of estimated threshold differentials and estimated weighting factors and selecting the threshold differential value and the weighting factor from the set that minimize the number of messages to send while satisfying the constraints.

17. A non-transitory machine-readable medium having instructions stored thereon, which, when executed by a processor, cause a system to:
configure a machine learning system to train on a plurality of training messages, wherein each individual instance of each training message has previously been sent to a first plurality of members of the online system, and each individual instance of each training message indicates one of a plurality of channels by which the individual instance of the training message was sent, and each individual instance of each training message is associated with one of either a positive response, negative response, or no response, from the member to whom the individual instance of the training message was sent, the machine learning system, subsequent to being trained and upon receiving an input message, to output an expected number of positive responses and an expected number of negative responses to be received from a second plurality of members, for each channel of the plurality of channels, based on the input message;
for the input message targeted for distribution to the second plurality of members of the online system, using the trained machine learning system, generating output indicating a number of positive responses expected from the second plurality of members and a number of negative responses expected from the second plurality of members, if the input message is sent to the second plurality of members, for each channel of the plurality of channels, and
calculating, for each channel of the plurality of channels for the input message, a differential value by subtracting from the number of positive responses expected from the second plurality of members, the number of negative responses expected from the second plurality of members, the number of negative responses multiplied by a weighting factor prior to said subtracting;
selecting a channel for the input message that results in a highest differential value of the differential values calculated for the input message; and
send the input message to the second plurality of members via the selected channel in response to the highest differential value exceeding a threshold differential value.

* * * * *

UNITED STATES PATENT AND TRADEMARK OFFICE
CERTIFICATE OF CORRECTION

| | | |
|---|---|---|
| PATENT NO. | : 10,650,325 B2 | Page 1 of 1 |
| APPLICATION NO. | : 14/814555 | |
| DATED | : May 12, 2020 | |
| INVENTOR(S) | : Gupta et al. | |

It is certified that error appears in the above-identified patent and that said Letters Patent is hereby corrected as shown below:

In the Claims

In Column 20, Line 63, in Claim 11, after "exceeding", insert --the--

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*